April 13, 1965   R. D. JESSEE   3,178,630
CONSTANT FREQUENCY ALTERNATING CURRENT SYSTEM
Filed Sept. 12, 1960   2 Sheets-Sheet 1

WITNESSES
John E. Healey Jr.
James F. Young

INVENTOR
Ralph D. Jessee
BY
ATTORNEY

United States Patent Office 3,178,630
Patented Apr. 13, 1965

3,178,630
CONSTANT FREQUENCY ALTERNATING
CURRENT SYSTEM
Ralph D. Jessee, Lima, Ohio, assignor to Westinghouse
Electric Corporation, East Pittsburgh, Pa., a corporation
of Pennsylvania
Filed Sept. 12, 1960, Ser. No. 55,462
10 Claims. (Cl. 321—7)

The present invention relates to a constant frequency alternating current power system, and more particularly to a system utilizing a static frequency converter for obtaining a constant or controlled frequency output from a polyphase source of different or variable frequency.

In alternating current power supply systems, a constant frequency output is normally required to supply the load and this is usually obtained from an alternating current generator driven at constant speed to generate constant frequency alternating current. In some cases, however, it is not possible to drive the generator at constant speed, and since the frequency varies with the speed, a variable frequency output results. In aircraft electrical systems, for example, the generator is normally driven from a main engine of the airplane, and if the generator is directly driven from the engine, the speed of the generator varies with the engine speed and the output frequency varies accordingly. Since a constant frequency is required, some means must be provided for obtaining a constant frequency output even though the speed of the prime mover varies. This has usually been done heretofore in aircraft systems by means of a constant speed drive, which is a hydraulic or mechanical variable ratio transmission interposed between the engine and the generator to obtain a substantially constant speed of the generator by changing the ratio of the transmission as the engine speed changes. These constant speed drives are complicated devices requiring frequent maintenance, and they are relatively heavy and bulky so that they are undesirable for aircraft use where weight and size must be kept to a minimum. Furthermore, these constant speed drives, being mechanical devices, are not capable of maintaining the frequency constant with sufficient accuracy for many purposes since some variation in speed of the generator necessarily occurs.

In my copending application, Serial No. 25,985, filed May 2, 1960, there is disclosed and claimed a different type of system for obtaining a constant frequency output from a variable speed generator, or other variable frequency polyphase source. In this system a static frequency converter is utilized to convert the variable frequency output of the source to a different and constant frequency which can be accurately controlled. The frequency converter consists essentially of an array of static switching devices which operate sequentially to connect each of the output leads of the converter to each of the input leads from the polyphase source in succession, and at a switching frequency which is controlled in such a manner that the output frequency is maintained accurately constant. A frequency converter is thus obtained which is completely static and has high efficiency and high reliability, and an alternating current power system is provided in which the generator can be directly driven from a variable speed prime mover and a constant frequency output obtained.

This system, however, has certain limitations. The maximum output current and voltage of the frequency converter are limited by the capacity of the semiconductor devices utilized in the static switches since, in the arrangement described above, only one switching device for each output phase is conducting at a time. Thus, the maximum output current and voltage are determined by the maximum rating of a single semiconductor device, and the power obtainable is limited by the capacity of the available semiconductor devices. It is also difficult to obtain a satisfactory output voltage waveform with a minimum number of switching devices, and relatively elaborate and heavy filters must be utilized to obtain a good output waveform. It is possible to improve the waveform by increasing the number of generator phases, and correspondingly increasing the number of semiconductor switches, but this does not increase the output obtainable since only one switching device for each output phase conducts at a time regardless of the number of input phases. The rating might, of course, be increased by operating semiconductor switching devices in series or parallel, but this is not a satisfactory solution because of the difficulty of obtaining proper voltage or current distribution between series or parallel operated semiconductors and, for a given number of input phases, the waveform would not be improved. Thus, with the system of the prior application there is no satisfactory way of increasing the output rating above that of a single semiconductor device, and the waveform of the output voltage can be improved only by increasing the number of input phases and correspondingly increasing the number of switching devices, but with little increase in output.

The principal object of the present invention is to provide an improved static frequency converter of the type described in which an increased output can be obtained from a given number of semiconductor switching devices.

Another object of the invention is to provide a static frequency converter of the type described in which the waveform of the output voltage is materially improved by increasing the number of input phases and the number of switching devices, and in which the increase in number of switching devices provides a corresponding increase in the output current obtainable.

A further object of the invention is to provide an alternating current power system in which a constant, or accurately controlled, output frequency is obtained from a polyphase source of different or variable frequency by means of a static frequency converter using semiconductor switching devices to effect the frequency conversion and in which an improved output waveform and increased output current are obtainable.

Other objects and advantages of the invention will be apparent from the following detailed description of an illustrative embodiment, taken in connection with the accompanying drawing, in which.

Figure 1:
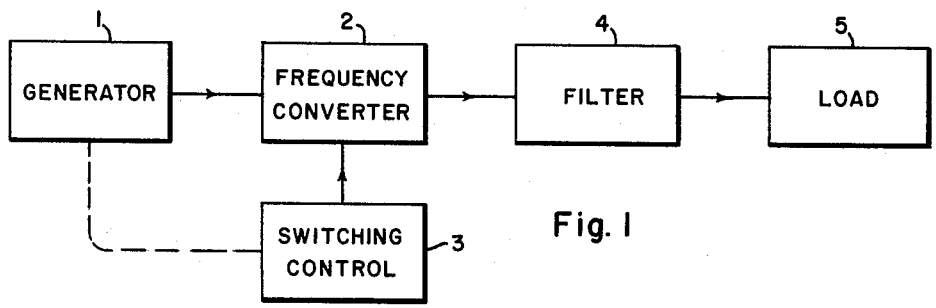
FIGURE 1 is a block diagram illustrating the general arrangement of the system.

As previously indicated, the present invention provides an improved system for obtaining a constant or controlled frequency output from a source of different or variable frequency. The general arrangement of such a system is illustrated by the block diagram of FIG. 1. As there shown, the system includes a polyphase alternating current generator 1 which may be driven by a prime mover at a variable speed, or in any desired manner, and which in the broadest aspect of the invention represents any polyphase source of alternating current of either variable or constant frequency.

The output of the generator 1 is supplied to a static frequency converter 2 which converts the output of the generator to alternating current of constant controlled frequency different from the generator frequency. The operation of the frequency converter 2 is controlled by a control means 3 which supplies control current or control signals to effect operation of the switching devices of the frequency converter at the necessary frequency to obtain the desired output frequency. The control means 3 may be of any suitable type, as more fully described hereinafter, which will supply the proper control current to obtain the desired output frequency, and which may be controlled in response to the generator frequency, as indicated by the dotted connection, or in any other suitable manner. The output of the frequency converter 2 will, in general, contain high frequency components which may be undesirable and a filter 4 is provided if necessary to eliminate the high frequency components. The output of the filter 4 which is supplied to the load 5 is a constant frequency alternating current of sinusoidal waveform, and its frequency is maintained accurately constant by the operation of the frequency converter 2 regardless of changes or variations in the frequency of the generator 1.

Figure 2:
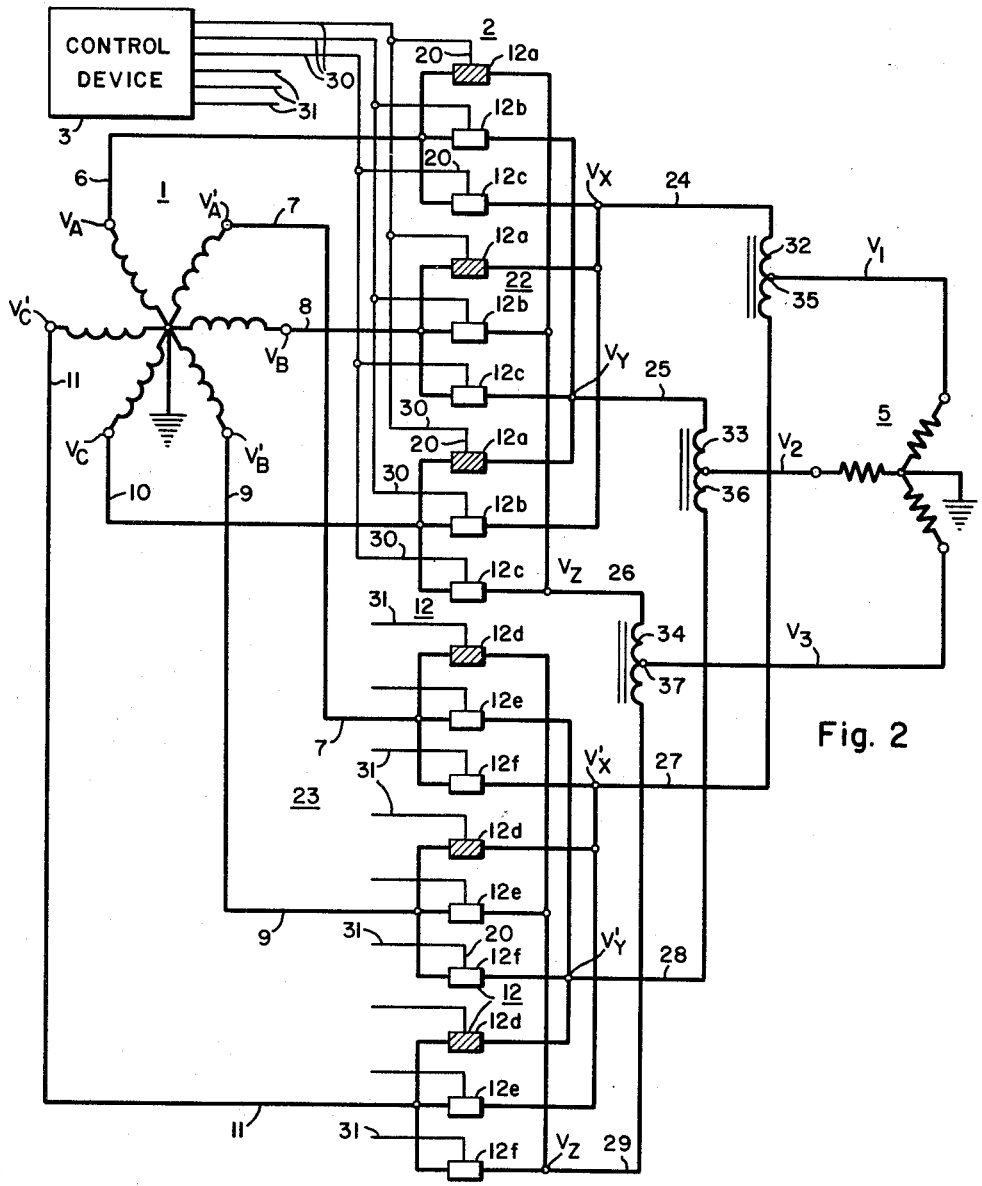
FIGURE 2 is a schematic diagram showing the circuit connections of a typical embodiment of the invention.

An illustrative embodiment of the frequency converter 2 is shown in FIG. 2, the generator 1 and load 5 also being shown. The filter 4 has been omitted to avoid unnecessary complication of the drawing and the control means 3 is shown only diagrammatically for the same reason, since it may be of any suitable type and is not a part of the present invention.

The generator 1 is shown as a six-phase generator having six windings displaced from each other as illustrated and connected to leads 6, 7, 8, 9, 10 and 11, respectively, which constitute the input leads of the frequency converter 2. It will be seen that the generator 1 provides two sets of three-phase voltages displaced from each other by 60 degrees. One set of three-phase voltages, designated $V_A$, $V_B$, and $V_C$ is connected to the leads 6, 8, and 10, respectively, while the other set of three-phase voltages, designated $V_A'$, $V_B'$, and $V_C'$, respectively is connected to the leads 7, 9 and 11, respectively. The frequency converter 2 thus has two sets of three input leads corresponding to two sets of three-phase voltages displaced 60 degrees from each other.

Figure 4:
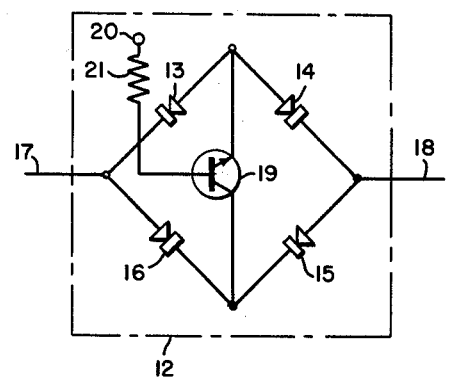
FIGURE 4 is a diagram showing a static switching device suitable for use in the circuit of FIG. 2.

The frequency converter 2 consists of an array of semiconductor switching devices 12, eighteen switching devices being utilized in the particular embodiment shown. The switching devices 12 may be any suitable type of static device which is capable of being switched on and off at high frequency and which has bilateral conductivity. A suitable type of switching device 12 is shown in FIG. 4. The device there shown consists of four diodes 13, 14, 15 and 16 connected in a bridge circuit with terminal leads 17 and 18 connected to opposite corners of the bridge. The emitter and collector of a transistor 19 are connected across the other two corners of the bridge, as shown, and a control lead 20 is provided for applying a control signal through a suitable impedance 21 to the base of the transistor 19.

The transistor 19 is shown as an npn transistor and permits current flow between collector and emitter when a positive control signal is applied to the base. In the absence of a control signal, or if the base is negative, the transistor 19 is non-conductive and the diodes block current flow in either direction between the terminal leads 17 and 18. When a positive control signal is applied to the base of the transistor 19, however, it becomes conductive and current can flow in either direction through the switching device 12. Thus, if the terminal 17 is positive, for example, current can flow through the diode 16, transistor 19, and diode 14 to the terminal 18. If the terminal 18 is the positive terminal, current can flow through the diode 15, transistor 19, and diode 13 to the terminal 17. Thus, the device has bilateral conductivity since current can flow equally well in either direction when a control signal is applied. Current flow is blocked in the absence of the proper control signal, so that the device is capable of functioning as a switch, and it can operate at high frequency because it is a static device utilizing only semiconductor devices.

It will be understood that instead of a transistor any other type of solid state device might be utilized in the circuit of FIG. 4 which is capable of blocking current flow in either direction in the absence of a control signal and which becomes conductive when a suitable control signal is applied. In general, the switching device 12 may be any type of static circuit or device which ether blocks current flow or permits current to flow in either direction in response to a control signal, and which is capable of being switched at sufficiently high frequency to permit the type of operation described hereinafter.

The connections of the switching devices 12 in the frequency converter 2 are illustrated in FIG. 2, the switching devices 12 being shown diagrammatically for simplicity although it will be understood that each of the switching devices 12 may be of the type shown in FIG. 4. As shown in FIG. 2, there are two sets of switching devices 12, generally designated 22 and 23, corresponding to the two sets of three-phase input voltages. The set 22 of switching devices includes three groups, each consisting of three switching devices designated 12a, 12b and 12c, respectively, and each group of switches is connected to one of the input leads 6, 8 and 10, as shown. One switch of each group is connected to an output lead 24, a second switch of each group is connected to an output lead 25 and the third switch of each group is connected to an output lead 26, the connections being made so that corresponding switches are connected to different output leads. Thus, as shown, the output lead 24, for example, is connected to the switch 12c of the first group, switch 12a of the second group and switch 12b of the third group, the other two output leads 25 and 26 being similarly connected to different switches of each group. The switches are controlled so that the corresponding switches of each group are simultaneously made conductive. Thus, for example, the three switches 12a may all be conductive at some instant, as indicated by shading in the drawing, and the input lead 6 is then connected to output lead 26, the input lead 8 is connected to output lead 24 and input lead 10 is connected to output lead 25. When the other switches 12b and 12c are made conductive in sequence, the input leads are connected to different output leads, and it will be seen that the effect is to connect each output lead to each input lead in succession in a predetermined sequence.

The second set 23 of switching devices 12 is similar to the first set and is similarly connected to the input leads 7, 9 and 11 corresponding to the second set of three-phase input voltages. The second set 23 of switching devices includes three groups each consisting of three switches designated 12d, 12e and 12f. Each group of three switching devices is connected to one of the input leads 7, 9 and 11, as shown, and each switch of each group is connected to one of a second set of output leads 27, 28 and 29, the connections being similar to those described above in connection with the first set of switching devices. Thus, when the switches 12d, 12e and 12f are sequentially made conductive the effect is to connect each one of the second set of output leads to each of the second set of input leads in succession in a predetermined sequence, as described above.

Figure 3:
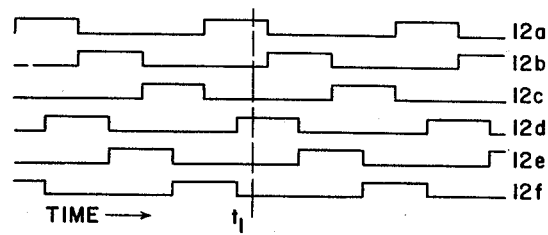
FIGURE 3 is a diagram illustrating the switching sequence of the circuit of FIG. 2.

The switching sequence of the switching devices 12 is illustrated in FIG. 3, which shows the switching order of the switching devices of both sets, the pulses representing the conductive periods for each switch, and all the switches having the same designation being switched simultaneously. FIG. 3 obviously may also be considered as representing the positive pulses of control current applied to each switch to make it conductive.

It will be seen that the switches of each of the three groups of the first set of switches 22 are made conductive in sequence, one after the other, in a predetermined order, so that each of the output leads 24, 25 and 26 is connected in succession to each of the input leads corresponding to the first set of three-phase voltages. The second set of switches 23 is similarly controlled, but with a time delay, or phase difference, from the switching times of the corresponding switches of the first set of switches, as shown in FIG. 3. This phase displacement between the switching times of the first and second set of switches is made equal to the phase difference between the two sets of three-phase input voltages. That is, in the six-phase generator illustrated, the two sets of three-phase voltages have a phase difference of 60 degrees, and the corresponding switching operations of the two sets of switches 22 and 23 are displaced by a time interval equivalent to a 60 degree phase displacement. It will be seen from FIG. 3 that at any instant, such as the time $t_1$, indicated in FIG. 3, for example, one switch in each group of each set is conducting, the conducting switches at the time $t_1$ being shaded in FIG. 2.

Figure 5:
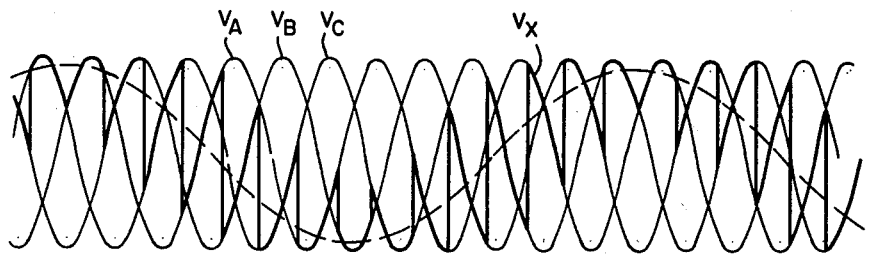
FIGURE 5 is a representation of the input and output waveforms of one part of the circuit of FIG. 2.

The effect of the operation of one set of switching devices is illustrated in FIG. 5, which shows one set of three-phase generator voltages $V_A$, $V_B$ and $V_C$. The line-to-ground voltage $V_x$ at the output lead 24 is shown by the heavy line in FIG. 5, and it will be seen that this consists of successive portions of each of the three input voltages applied to the output lead 24 for equal successive periods of time. The output voltage $V_x$ is seen to be an essentially sinusoidal voltage containing relatively large high frequency components, the fundamental component being shown by a dash line in FIG. 5. It will be seen that the fundamental frequency of the output voltage $V_x$ is lower than the frequency of the generator, and that the waveform is relatively poor since it contains large high frequency components. The output voltage $V_x$ only has been shown in FIG. 5 to avoid confusion of the drawing, but it will be apparent that the voltages $V_y$ and $V_z$ at the output leads 25 and 26 are exactly similar to the voltage $V_x$ but displaced therefrom 120 degrees and 240 degrees, respectively.

It can be shown that the voltage $V_x$ is expressed by the following equation:

$$V_x = \frac{3\sqrt{3}E}{2\pi}[\cos(\alpha-\beta-60°) + \tfrac{1}{2}\cos(1\alpha+\beta-120°)$$
$$+ \tfrac{1}{4}\cos(4\alpha-\beta-60°) + \tfrac{1}{5}\cos(5\alpha+\beta-120°)$$
$$+ \tfrac{1}{7}\cos(7\alpha-\beta-60°) + \tfrac{1}{8}\cos(8\alpha+\beta-120°)$$
$$+ \cdots ] \qquad (1)$$

where $\alpha$ is proportional to the switching frequency, $\beta$ is proportional to the generator frequency, and E is the maximum value of the sinusoidal generator voltage. Similar equations can be obtained for the voltages $V_y$ and $V_z$.

The second set 23 of switching devices 12 connects the second set of leads 27, 28 and 29 to the second set of three-phase voltages $V_A'$, $V_B'$ and $V_C'$ in the same manner, but with the switching times delayed, with respect to the switching of the first set, as described above. Since the voltages applied to the second set of output leads are displaced 60 degrees from those applied to the first set of output leads, and are switched at a correspondingly later time, the voltages $V_x'$, $V_y'$ and $V_z'$ at the output leads 27, 28 and 29, respectively, can be obtained directly from the equations for the first set of output voltages by substituting $\alpha-60°$ for $\alpha$ and $\beta-60°$ for $\beta$. In this way, the voltage $V_x'$ is found to be expressed by the equation:

$$V_x' = \frac{3\sqrt{3}E}{2\pi}[\cos(\alpha-\beta-60°) + \tfrac{1}{2}\cos(2\alpha+\beta+60°)$$
$$+ \tfrac{1}{4}\cos(4\alpha-\beta+120°) + \tfrac{1}{5}(\cos 5\alpha+\beta-120°)$$
$$+ \tfrac{1}{7}\cos(7\alpha-\beta-60°) + \tfrac{1}{8}\cos(8\alpha+\beta+60°)$$
$$+ \cdots ] \qquad (2)$$

Similar expressions can be obtained for the voltages $V_y'$ and $V_z'$ which differ from $V_x'$ by 120 degrees and 240 degrees, respectively.

Inspection of these equations shows that the fundamental frequency of the output voltages of the frequency converter is equal to the difference between the switching frequency and the generator frequency. The output frequency, therefore, can readily be controlled by controlling the frequency of switching, and the output frequency can be held constant irrespective of variations in the generator frequency by controlling the switching frequency to maintain a constant difference between the switching frequency and the generator frequency. It will also be seen that the fundamental components of the two sets of output voltages are in phase, so that they can be added directly, and that certain of the high frequency components are 180 degrees out of phase, making it possible to eliminate these undesired frequencies as explained below.

The switching devices 12 of the frequency converter may be controlled by any suitable type of switching control means 3 which maintains the desired difference between the generator frequency and the switching frequency and the required phase displacement between the switching of the two sets of switching devices. Any suitable type of control device may be used for this purpose. Thus, the switching control may include any suitable type of frequency sensitive circuit which senses the generator frequency or the output frequency and controls a local oscillator circuit or multi-vibrator to provide a control current of the desired frequency for operation of the switching devices 12 by applying positive pulses to the control terminals 20 in the proper sequence. Similarly a frequency sensing circuit could be used to control the output frequency of a static inverter supplied from any suitable direct current source to provide a control current of the desired frequency for the switching devices 12. It will also be obvious that a rotary type of control device, such as that fully described in the copending application above referred to, might be utilized.

It will be apparent to those skilled in the art that various control arrangements of these general types are possible and may be used to control the switching frequency by providing current pulses at the proper frequency in sequence through leads 30 to the control terminals 20 of the first set of switches, and through leads 31 to the control terminals 20 of the second set of switches, with the required phase difference between the signals supplied to the two sets of leads. It will be understood, therefore, that the control means 3 may be of any suitable type and it has not been illustrated in detail to avoid unnecessary complication of the drawing, since the control means, as such, is not a part of the present invention.

In the system as so far described, two sets of three-phase output voltages are provided appearing at the two sets of output leads 24, 25, 26, and 27, 28, 29, respectively. As previously pointed out, these voltages have undesirably large high frequency components while their fundamental components are exactly in phase. In order to obtain a more satisfactory final output voltage, therefore, the two sets of output voltages are combined in the manner shown in FIG. 2. A reactor 32 is connected between the corresponding leads 24 and 27 of the two sets of output leads, a similar reactor 33 is connected between the corresponding leads 25 and 28, and a reactor 34 is connected between the corresponding leads 26 and 29. Output terminal means 35, 36 and 37 are connected to taps at the mid-points of each of the reactors, and these output terminals 35, 36 and 37 are the final output terminals of the frequency converter 2 and are connected to the three-phase load 5.

The voltage appearing across the reactor 32 is equal to the difference $X_x - V_x'$ of the voltages applied to the reactor. Since the reactor is center-tapped, the voltage between the lead 24 and the terminal 35 is $\frac{1}{2}(V_x - V_x')$. Therefore, the line-to-ground output voltage $$V_1 = V_x - \frac{1}{2}(V_x - V_x')$$
$$= \frac{1}{2}(V_x - V_x') \qquad (3)$$

Substituting the values of $V_x$ and $V_x'$ from Equations 1 and 2 gives:

$$V_1 = \frac{3\sqrt{3}E}{2}[\cos(\alpha - \beta - 60°) + \tfrac{1}{5}\cos(5\alpha + \beta - 120°)$$
$$+ \tfrac{1}{7}\cos(7\alpha - \beta - 60°) + \cdots] \qquad (4)$$

It will be seen that the resulting waveform of the final output voltage $V_1$ is greatly improved by the elimination of the lower high frequency components. Similar equations can be derived for the voltages $V_2$ and $V_3$ appearing at the output terminals 36 and 37, these voltages being similar to the voltage $V_1$, but displaced from it by 120 degrees and 240 degrees, respectively.

Figure 6:
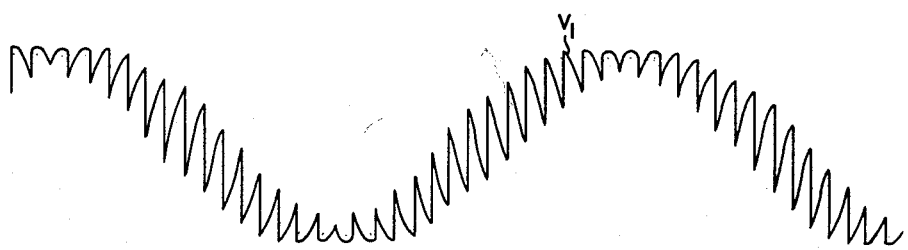
FIGURE 6 is a representation of the final output voltage waveform of one phase of the circuit of FIG. 2.

The waveform of the output voltage $V_1$ is shown in FIG. 6, and it will be evident that while it still contains high frequency components, they are of relatively low magnitude and the waveform has been greatly improved as compared to that of the voltage $V_x$. For many purposes, the waveform of the voltage $V_1$ may be sufficiently close to a sine wave to be usable without a filter. If a still better waveform is desired, however, a relatively simple filter can be utilized to remove the remaining high frequency components to obtain an accurately sinusoidal waveform. Thus, by separately switching the two sets of polyphase input voltages at a time interval corresponding to the phase displacement between them, voltages are obtained which can be combined in the manner shown so that the most objectionable high frequency components cancel across the reactor and do not appear in the final output voltage.

This arrangement also has a further very important advantage in making possible a greatly increased output current, as compared to that obtainable in the arrangement of the prior application referred to above. It will be seen from FIG. 2 that two switching devices for each final output phase are conducting at any instant, so that the effect is that of operating two switching devices in parallel in each output phase, but without the difficulties normally encountered in attempting to operate semiconductors in parallel. In effect, in the illustrated embodiment two three-phase inputs are separately switched, but by utilizing the principles of the invention, the effect of combining the output of the two separate sets of switches is not only to improve the waveform, but to double the obtainable power output by paralleling the switching devices through the reactors. The reactors also serve another purpose in this respect since they tend to force equal division of current through the two switches which are conducting at any given instant. If the currents in the two leads connected to one reactor tend to become unequal, for any reason, a voltage is induced in the reactor which tends to equalize them, thus maintaining the proper current division. In the illustrated embodiment, therefore, two sets of nine switches operate in parallel and double the output obtainable, as compared to that of a system having only one set of switches, as well as very substantially improving the waveform.

It will be apparent that a switching frequency converter has been provided which is capable of changing a polyphase alternating current input of either constant or varying frequency to a different and accurately constant output frequency. This result is accomplished by a relatively simple arrangement of static switching devices and reactors which makes it possible not only to obtain the desired constant output frequency, but to obtain a relatively high output current from a given number of switches with a waveform which is greatly improved over that obtainable in previous arrangements.

The principles of the invention are obviously applicable to other arrangements and different numbers of phases. Thus, a six-phase generator has been shown which provides two sets of three-phase input voltages. It will be obvious that a twelve-phase generator could equally well be used and the output voltage switched in the manner described by means of four sets of switches instead of the two shown for the six-phase generator illustrated. The resulting output voltages could then be combined through reactors in the manner shown to obtain three-phase output voltages. It will be obvious that the greater the number of input phases, the better will be the output voltage waveform and the output current obtainable from the converter with semiconductor switches of a given type will increase proportionally to the number of switches utilized. It will also be obvious that although a three-phase output has been illustrated, the invention may be applied equally well to produce any desired number of output phases as long as the number of input phases is a multiple of the number of output phases.

It should now be apparent that an alternating current power system has been provided for obtaining constant frequency output by means of a static frequency converter of greatly improved characteristics, since the available output of the converter is increased proportionally to the number of switches utilized and a good output voltage waveform can readily be obtained. A secific embodiment of the invention has been shown and described for the purpose of illustration, but it will be understood that the invention is not limited to the specific arrangement shown, but is capable of various modifications and other embodiments within the scope of the invention.

I claim as my invention:

1. An alternating current power system comprising a polyphase source of alternating current providing a plurality of sets of polyphase voltages having a fixed phase difference, a set of output leads for each of said sets of polyphase voltages, bilaterally conductive switching means for connecting each lead of each of said sets of output leads to each of the corresponding set of polyphase voltages in succession in a predetermined sequence and at a switching frequency having a predetermined relation to the frequency of the source, the switching times of the different sets of leads differing by a time interval equivalent to said phase difference between the sets of polyphase voltages, and impedance means connected to said output leads for combining the voltages of corresponding leads of the different sets of output leads.

2. An alternating current power system comprising a polyphase source of alternating current providing a plurality of sets of polyphase voltages having a fixed phase difference, a set of output leads for each of said sets of polyphase voltages, bilaterally conductive switching means for connecting each lead of each of said sets of output leads to each of the corresponding set of polyphase voltages in succession in a predetermined sequence and at a switching frequency having a predetermined relation to the frequency of the source, the switching times of the different sets of leads differing by a time interval equivalent to said phase difference between the sets of polyphase voltages, and reactors connected between corresponding leads of the different sets of output leads, said reactors having output terminal means connected to their mid-points.

3. An alternating current power system comprising a polyphase source of alternating current providing a plurality of sets of polyphase voltages having a fixed phase difference, a set of output leads for each of said sets of polyphase voltages, bilaterally conductive switching means for connecting each lead of each of said sets of output leads to each of the corresponding set of polyphase voltages in succession in a predetermined sequence, means for effecting operation of the switching means at a frequency having a constant difference from the frequency of the source and with a time interval between the switching of the different sets of leads equivalent to said phase difference between the sets of polyphase voltages, and impedance means connected to said output leads for combining the voltages of corresponding leads of the different sets of output leads.

4. An alternating current power system comprising a polyphase source of alternating current providing a plurality of sets of polyphase voltages having a fixed phase difference, a set of output leads for each of said sets of polyphase voltages, bilaterally conductive switching means for connecting each lead of each of said sets of output leads to each of the corresponding set of polyphase voltages in succession in a predetermined sequence, means for effecting operation of the switching means at a frequency having a constant difference from the frequency of the source and with a time interval between the switching of the different sets of leads equivalent to said phase difference between the sets of polyphase voltages, and reactors connected between corresponding leads of the different sets of output leads, said reactors having output terminal means connected to their mid-points.

5. An alternating current power system comprising a polyphase source of alternating current providing at least two sets of three-phase voltages having a fixed phase difference, a set of output leads for each of said sets of three-phase voltages, bilaterally conductive switching means for each set of output leads adapted to connect each lead of the set to each of the corresponding set of three-phase voltages in succession in a predetermined sequence, the switching means for all the sets of output leads operating at a frequency having a predetermined relation to the frequency of said source and with a time interval between the switching of the different sets of leads equivalent to said phase difference between the sets of three-phase voltages, and impedance means connected to said output leads for combining the voltages of corresponding leads of the different sets of output leads.

6. An alternating current power system comprising a polyphase source of alternating current providing at least two sets of three-phase voltages having a fixed phase difference, a set of output leads for each of said sets of three-phase voltages, bilaterally conductive switching means for each set of output leads adapted to connect each lead of the set to each of the corresponding set of three-phase voltages in succession in a predetermined sequence, the switching means for all the sets of output leads operating at a frequency having a predetermined relation to the frequency of said source and with a time interval between the switching of the different sets of leads equivalent to said phase difference between the sets of three-phase voltages, and reactors connected between corresponding leads of the different sets of output leads, said reactors having output terminal means connected to their mid-points.

7. A frequency converter for converting polyphase alternating current of one frequency to alternating current of a different frequency, said converter comprising a plurality of sets of input leads adapted to be connected to polyphase voltage sources having a fixed phase difference, a set of output leads for each of said sets of input leads, bilaterally conductive switching means for connecting each lead of each of said sets of output leads to each lead of the corresponding set of input leads in succession in a predetermined sequence and at a switching frequency having a predetermined relation to the frequency of the source, the switching times of the different sets of leads differing by a time interval equivalent to said phase difference between the sets of polyphase voltages, and impedance means connected to said output leads for combining the voltages of corresponding leads of the different sets of output leads.

8. A frequency converter for converting polyphase alternating current of one frequency to alternating current of a different frequency, said converter comprising a plurality of sets of input leads adapted to be connected to polyphase voltage sources having a fixed phase difference, a set of output leads for each of said sets of input leads, bilaterally conductive switching means for connecting each lead of each of said sets of output leads to each lead of the corresponding set of input leads in succession in a predetermined sequence and at a switching frequency having a predetermined relation to the frequency of the source, the switching times of the different sets of leads differing by a time interval equivalent to said phase difference between the sets of polyphase voltages, and reactors connected between corresponding leads of the different sets of output leads, said reactors having output terminal means connected to their mid-points.

9. A frequency converter for converting polyphase alternating current of one frequency to alternating current of a different frequency, said converter comprising at least two sets of input leads adapted to be connected to three-phase voltage sources having a fixed phase difference, a set of output leads for each of said sets of input leads, bilaterally conductive switching means for each set of output leads adapted to connect each lead of the set to each lead of the corresponding set of input leads in succession in a predetermined sequence, the switching means for all the sets of output leads operating at a frequency having a predetermined relation to the frequency of said source and with a time interval between the switching of the different sets of leads equivalent to said phase difference between the sets of three-phase voltages, and impedance means connected to said output leads for combining the voltages of corresponding leads of the different sets of output leads.

10. A frequency converter for converting polyphase alternating current of one frequency to alternating current of a different frequency, said converter comprising at least two sets of input leads adapted to be connected to three-phase voltage sources having a fixed phase difference, a set of output leads for each of said sets of input leads, bilaterally conductive switching means for each set of output leads adapted to connect each lead of the set to each lead of the corresponding set of input leads in succession in a predetermined sequence, the switching means for all the sets of output leads operating at a frequency having a predetermined relation to the frequency of said source and with a time interval between the switching of the different sets of leads equivalent to said phase difference between the sets of three-phase voltages, and reactors connected between corresponding leads of the different sets of output leads, said reactors having output terminal means connected to their mid-points.

References Cited by the Examiner

UNITED STATES PATENTS

| 1,955,524 | 4/34 | Augier et al. | 321—66 |
| 2,213,945 | 9/40 | Alexanderson | 321—60 |
| 2,707,258 | 4/55 | Boyer et al. | 321—65 |
| 2,995,696 | 8/61 | Stratton et al. | 321—69 |

FOREIGN PATENTS

| 81,475 | 9/34 | Sweden. |
| 1,231,594 | 4/60 | France. |

LLOYD McCOLLUM, *Primary Examiner.*

SAMUEL BERNSTEIN, *Examiner.*